United States Patent [19]

Cochran

[11] 3,800,168

[45] Mar. 26, 1974

[54] SYNCHRONIZED TIME DELAY CIRCUIT

[75] Inventor: David S. Cochran, Palo Alto, Calif.

[73] Assignee: Hewlett-Packard Company, Palo Alto, Calif.

[22] Filed: Apr. 20, 1972

[21] Appl. No.: 245,999

[52] U.S. Cl. .................................. 307/290, 307/293

[51] Int. Cl. .......................... H03k 3/15, H03k 17/26

[58] Field of Search ..................... 307/283, 290, 293

[56] References Cited

UNITED STATES PATENTS

| | | | |
|---|---|---|---|
| 3,287,608 | 11/1966 | Pokrant | 307/290 X |
| 3,253,157 | 5/1966 | Lemon, Jr. | 307/293 X |
| 3,408,513 | 10/1968 | Cooper et al. | 307/293 |

FOREIGN PATENTS OR APPLICATIONS

| | | | |
|---|---|---|---|
| 1,409,857 | 7/1965 | France | 307/290 |

*Primary Examiner*—Stanley D. Miller, Jr.
*Attorney, Agent, or Firm*—Roland I. Griffin

[57] ABSTRACT

A Schmitt trigger flip flop is configured at its input with a resistor-capacitor integrating network connected to a switchable voltage source and at its output for receiving external synchronizing pulses to provide a unilateral output pulse delayed in time from the application of input voltage and in synchronization with one of the external synchronizing pulses.

4 Claims, 2 Drawing Figures

SYNCHRONIZED TIME DELAY CIRCUIT

BACKGROUND AND SUMMARY OF THE INVENTION

This invention relates generally to synchronized time delay circuits and more particularly to an improved and simplified version thereof. These types of circuits have been used to provide an output pulse delayed from the time of application of a trigger voltage and in synchronization with a pulse externally supplied, typically at the input. The problems encountered with previous circuits have been susceptibility to reset from the synchronizing pulses, quiescent power consumption, and high component count. Accordingly, it is an object of this invention to provide a circuit for providing a unilateral output voltage step which disconnects the synchronizing trigger to guarantee stability. A further object is to provide a circuit having low quiescent power consumption in contemplation of its possible operation from a battery power supply. An additional object is to provide a simplified circuit having a small number of components.

These objects are accomplished in accordance with the preferred embodiment of this invention by employing a Schmitt trigger flip flop having a resistor and a switching element serially connected between its input and a source of D.C. potential and having a storage element connected between its input and a source of reference potential. The resistor-capacitor network allows the input voltage to rise gradually toward a predetermined value of a trigger threshold, thereby creating a delay in time. Synchronization pulses are applied at the output of the Schmitt trigger flip flop for determing the point in time at which the output pulse will occur. After the Schmitt trigger flip flop changes state the synchronizing pulses are automatically disconnected and cannot further affect operation of the circuit.

DESCRIPTION OF THE PREFERRED EMBODIMENT

Figure 1:
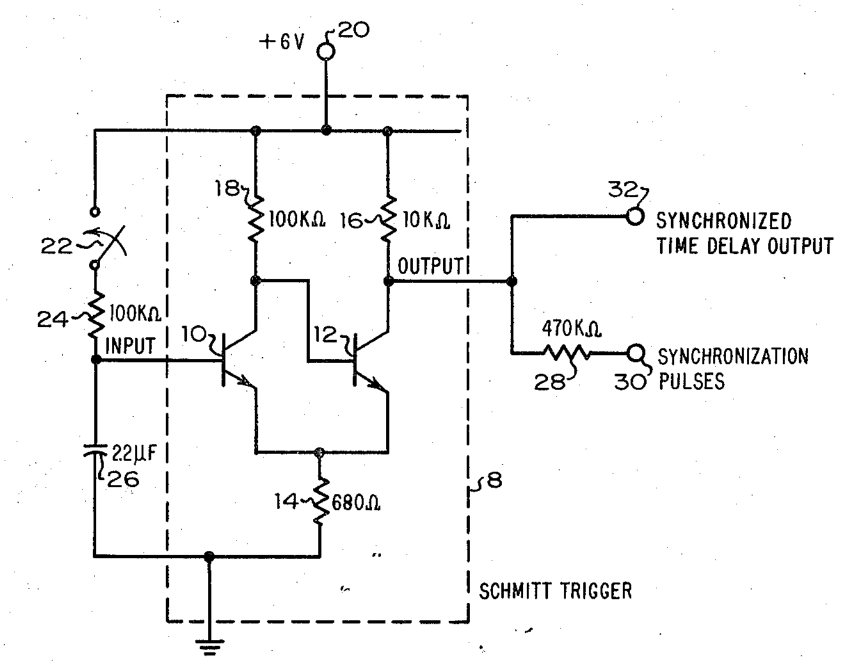
FIG. 1 is a schematic diagram of the preferred embodiment of the invention.
Figure 2:
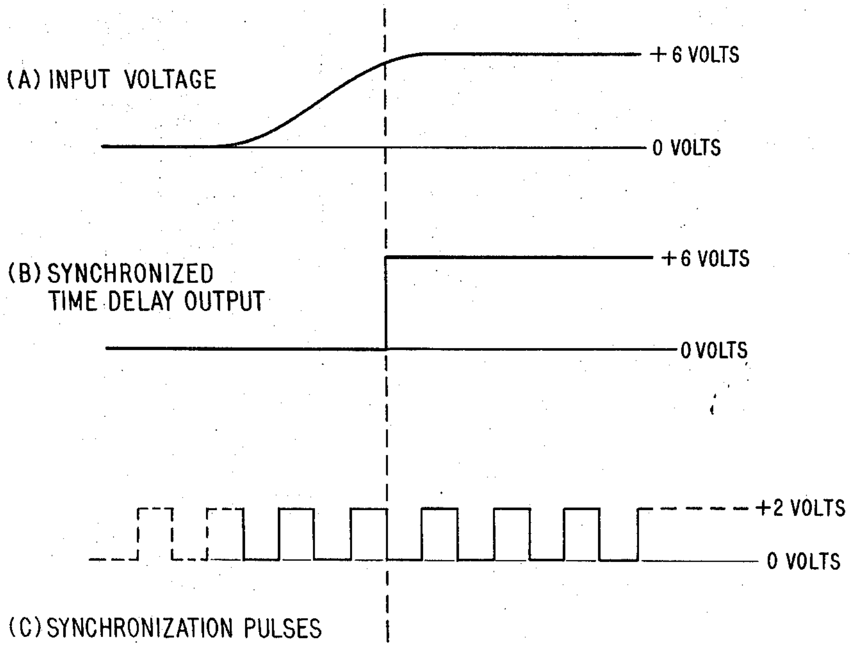
FIGS. 2 (a)–(c) show typical input, output, and synchronization pulse waveforms as functions of time.

FIG. 1 shows a synchronized time delay circuit utilizing a Schmitt trigger flip flop 8 comprising transistors 10 and 12, the emitters of which are common and connected through a resistor 14 to a source of reference potential, such as ground, and the collectors of which are returned through resistors 16 and 18 to a source of operating potential 20. Resistor 18 is connected to the base of transistor 12 for the purpose of providing a base current path to maintain transistor 12 in an "on" state, thereby holding the collector of transistor 12, and hence the output of the synchronized time delay circuit, near ground potential. A switch 22 is connected to the source of operating potential 20 and is also serially connected through a resistor 24 to the base of transistor 10, which base is also connected through a capacitor 26 to the source of reference potential. Closure of switch 22 allows the base voltage of transistor 10 to increase gradually, as shown in FIG. 2(a), toward a predetermined threshold voltage level, defined by the base-emitter voltage of transistor 10 and the voltage drop produced by current flowing through resistor 14. Synchronization pulses 30, such as those shown in FIG. 2(c), are injected through a resistor 28 to the output of the synchronized time delay circuit at the collector of transistor 12. When the combined magnitudes of the base voltage of transistor 10 and a portion of the negative going transition voltage of a synchronization pulse as determined by the division ratio of resistors 28 and 14 exceeds the threshold voltage, transistor 10 turns on and transistor 12 turns off. At this time the collector of transistor 12 assumes the operating potential value, thereby forming the output voltage stop as shown in FIG. 2(b). Further application of synchronization pulses 30 is ineffective to alter the voltage at the synchronized time delay output 32.

I claim:

1. A synchronized time delay circuit comprising:

a transistorized schmitt trigger circuit having an input and an output;

means for applying a gradually increasing input voltage at the input of the Schmitt trigger circuit; and means for applying synchronization pulses at the output of the Schmitt trigger circuit to provide a unilateral pulse at the output of the Schmitt trigger circuit when the combined magnitudes of the input voltage and a portion of a synchronization pulse exceed a predetermined threshold voltage level and to prevent subsequent synchronization pulses from changing the state of the Schmitt trigger circuit.

2. A synchronized time delay circuit as in claim 1, wherein the means for applying a gradually increasing voltage at the input comprises a resistor-capacitor integrating network switchably connected between a source of D.C. potential and a source of reference potential and additionally connected to the input of the Schmitt trigger circuit.

3. A synchronized time delay circuit as in claim 1 wherein the Schmitt trigger circuit comprises input and output transistors, the base of the input transistor being the input of the Schmitt trigger circuit, the emitters of the input and output transistors being common and returned through a resistor to a source of reference potential, the collectors of the input and output transistors being returned through separate resistors to a source of operating potential, the collector of the input transistor being connected to the base of the output transistor, and the collector of the output transistor being the output of the Schmitt trigger circuit.

4. A synchronized time delay circuit as in claim 3 wherein said means for applying synchronization pulses includes a resistor connected to the collector of the output transistor of the Schmitt trigger circuit for applying synchronization pulses thereto.

* * * * *